April 29, 1947.　　　A. WALDORF　　　2,419,610
PERSPECTIVE DRAFTING DEVICE
Filed June 28, 1944　　　7 Sheets-Sheet 1
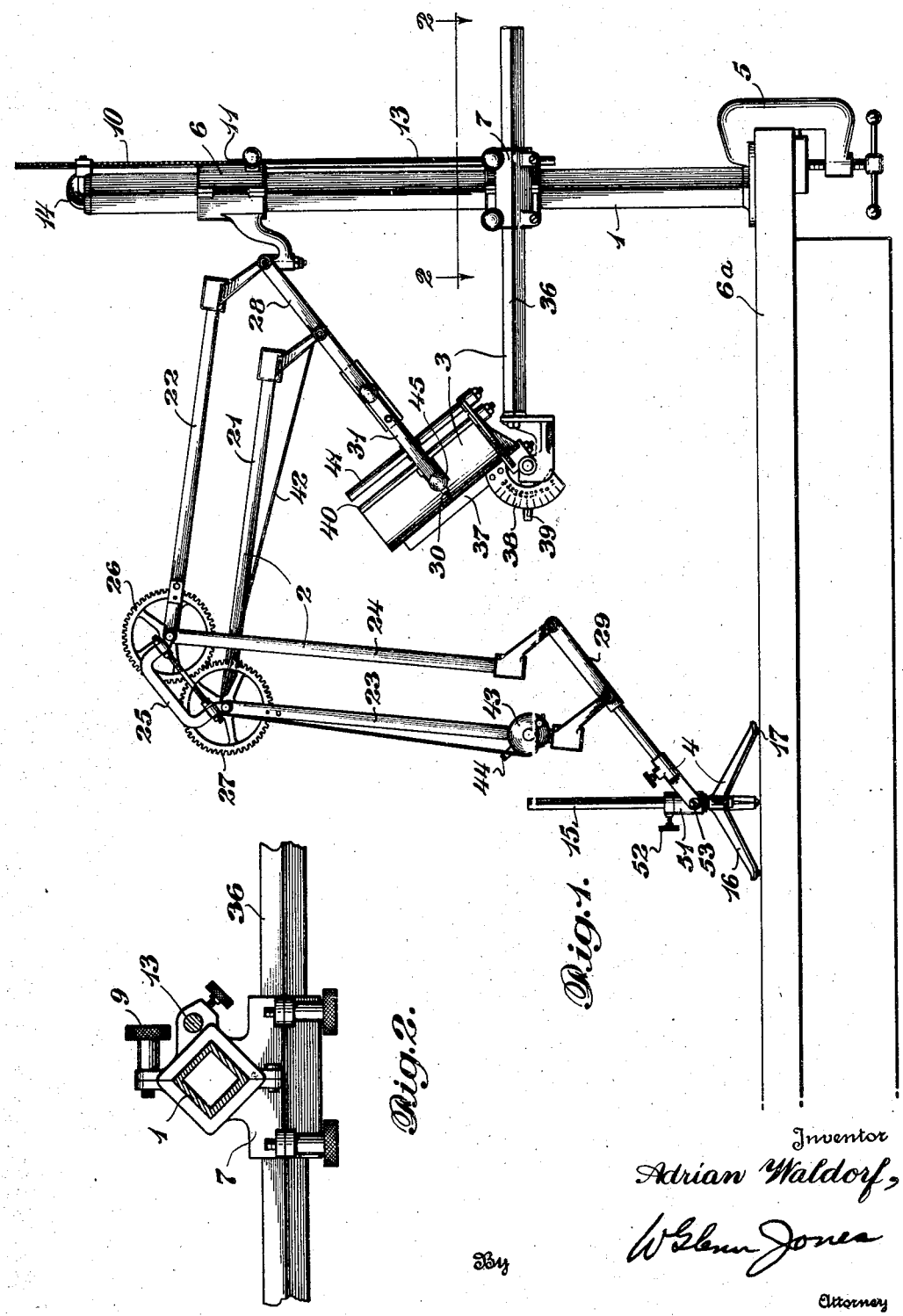

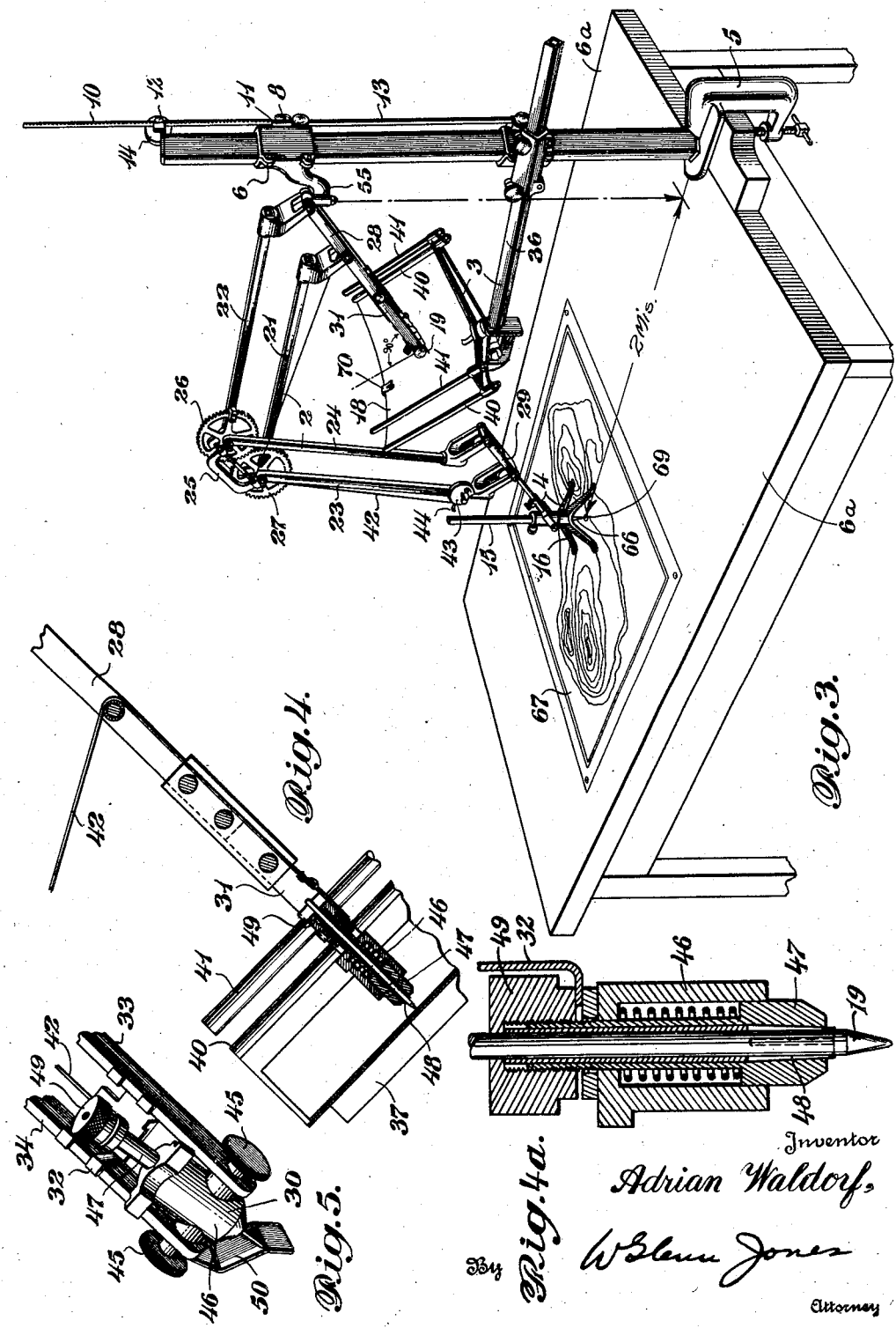

Inventor
Adrian Waldorf,
By W Glenn Jones
Attorney

April 29, 1947. A. WALDORF 2,419,610
PERSPECTIVE DRAFTING DEVICE
Filed June 28, 1944 7 Sheets-Sheet 7
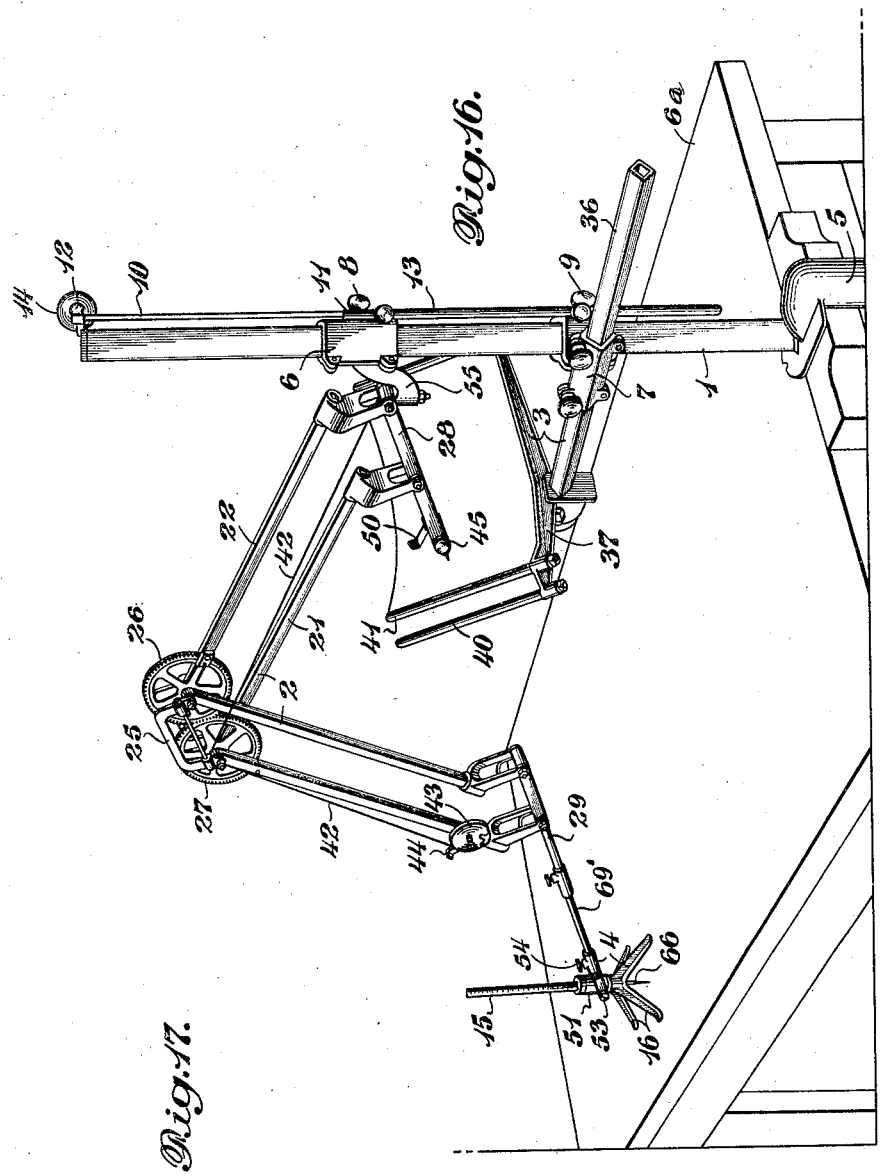
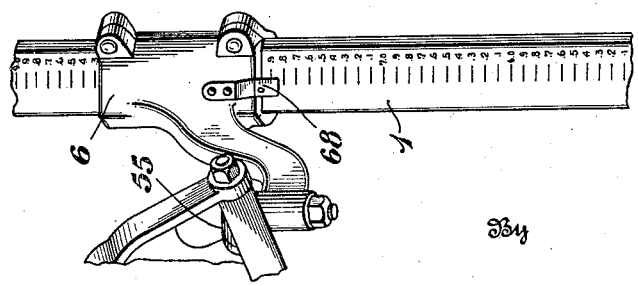
Inventor
Adrian Waldorf,
By W Glenn Jones
Attorney Patented Apr. 29, 1947

2,419,610

UNITED STATES PATENT OFFICE 2,419,610

PERSPECTIVE DRAFTING DEVICE

Adrian Waldorf, Washington, D. C.

Application June 28, 1944, Serial No. 542,591

6 Claims. (Cl. 33—18)

(Granted under the act of March 3, 1883, as amended April 30, 1928; 370 O. G. 757)

This invention relates to devices and methods used in building up perspective sketches of terrain from contour maps thereof and any additional information that might be available.

An object of the invention is to make a perspective sketch of a tract of land as it would appear from any predetermined distance, elevation and bearing, having only a contour map of the place to go by.

Another object is to provide means for reproducing contour lines from a map on a sketch in relative perspective with respect to an assumed viewpoint at any distance, elevation and bearing relative to said map, whereby a complete perspective sketch may be made by proper connection of the visible portions of the contours.

A further object is to construct a device for tracing contours from a map onto a sheet of paper as they would appear from an assumed point in space relative to the terrain represented on the map.

Figure 6:
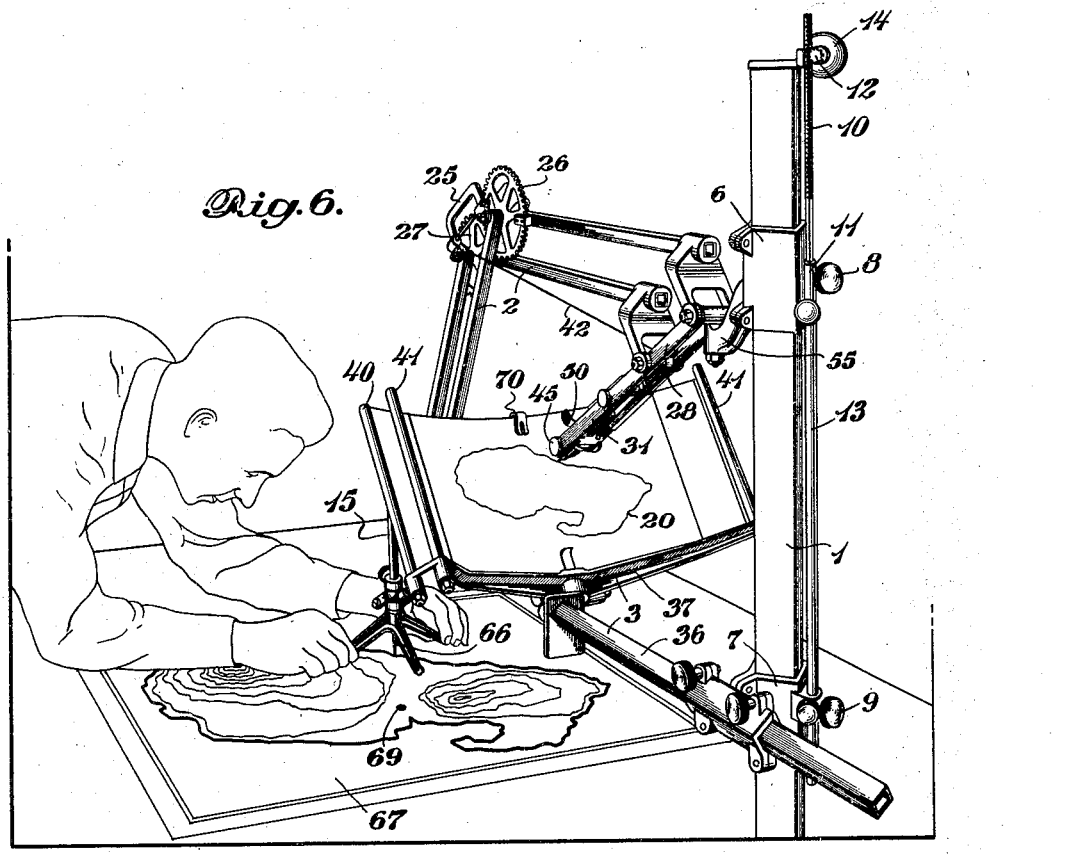
Figure 7:
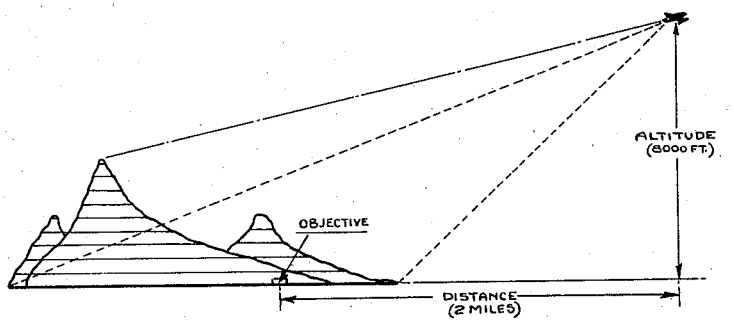
Figure 8:
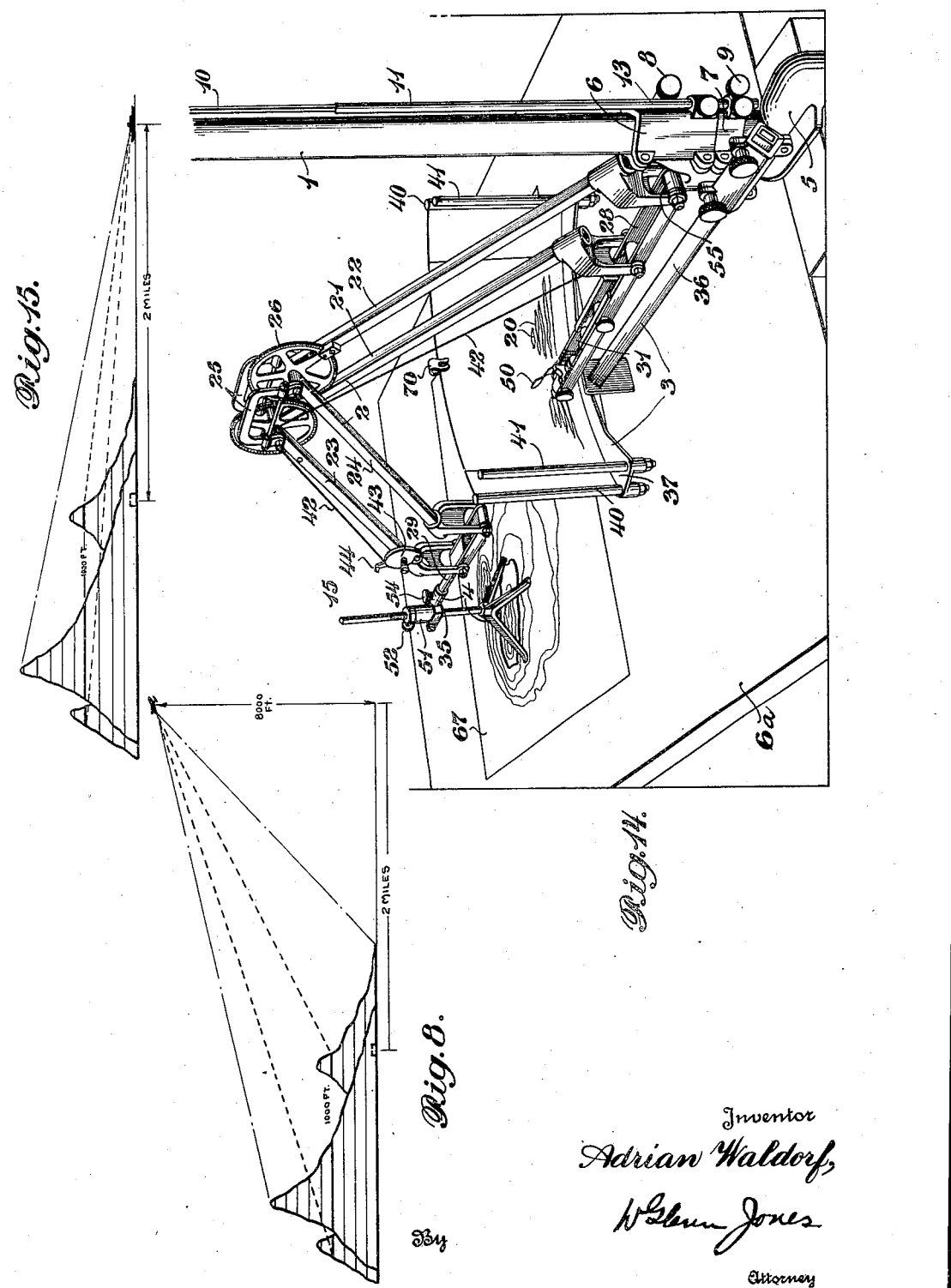
Figure 9:
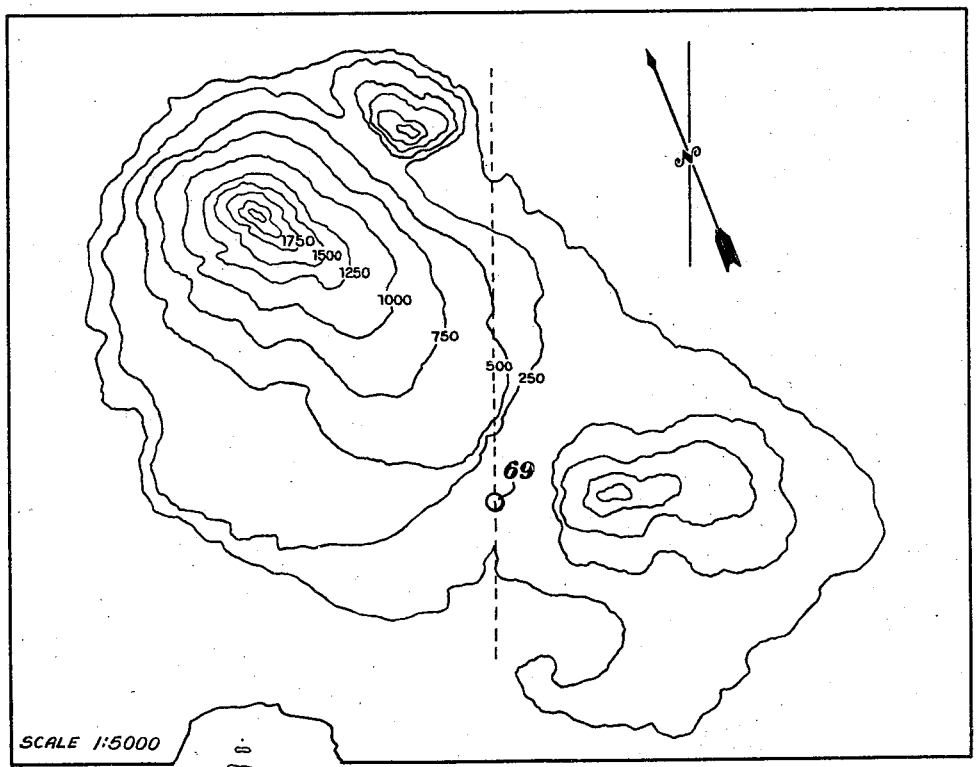

Further and more specific objects will become apparent in the detailed description of a preferred form of device used in the present invention, and by reference to the accompanying drawings, wherein:

Fig. 1 is a side view of the device used in this invention clamped to a table and assembled for use, Fig. 2 is a detail sectional view taken along the line 2—2 of Fig. 1, Fig. 3 is a perspective view of the assembly, showing the relation of parts more clearly, Fig. 4 is a partial view in section thru the longitudinal axis of the pencil holder and parts of the picture panel, Fig. 4a is a sectional view of the pencil holder on an enlarged scale, Fig. 5 is a perspective view of the pencil holder assembly looking at it from above, Fig. 6 shows the device in operation, after the coast line of the island shown in the map on the table has been traced on the paper mounted on the picture panel, Figs. 7 and 8 show how the perspective of the different contours is obtained from an elevated point of observation, Fig. 9 represents a contour map of the island which was reproduced in perspective, for the purpose of illustrating the method and device used in this invention, Figs. 10 to 13 show the consecutive steps in making the perspective view, Fig. 14 shows the device adjusted for a sea-level viewpoint, while tracing the 1000' contour, Fig. 15 illustrates how the perspective of this contour is obtained, Fig. 16 shows the device with the pencil extension assembly removed and with a stylus extenson tube inserted for a different range of relative distances and a different size picture, and Fig. 17 is an enlarged detail view of a portion of the altitude column with the arm collar assembly clamped in the 8000' position.

The portable perspective sketcher, as this device is called, is designed to produce in perspective the elevations represented by the contour lines of a topographical map. When elevation lines thus produced are suitably connected and shaded, a perspective view of the contoured area results.

Perspective views of any area for which contour lines have been, or can be drawn, may be rendered from any distance, height or bearing within the physical limitations of the instrument.

The portable perspective sketcher consists essentially of three major parts: the altitude column 1, the arm assembly 2, the picture and panel assembly 3, and stylus assembly 4.

The altitude column is fitted with a base clamp 5 at its lower end by which it attaches to a table or drafting board 6a. The altitude column is calibrated on one face to a scale of 1:5000 as shown in Fig. 17.

The arm assembly and picture panel assembly attach to collars 6 and 7 respectively which are located in position on the altitude column by means of thumb screws 8 and 9 respectively.

The rack end 10 of the tie rod and rack assembly 11 engages a pinion 12 at the top of the altitude column 1 while the rod end 13 extends through holes in the arm and picture panel assembly collars 6 and 7. Both collars may be locked to the rod at pre-set distances and moved as a unit by rotating the pinion knob 14 and pinion 12.

The stylus assembly 4 is equipped with a small altitude column 15 also calibrated to a scale of 1:5000. The feet 16 of the stylus are fitted with balls 17 so that the stylus will move easily over the surface of the map.

The picture panel holds the drawing paper 18 on which a pencil 19 in the holder assembly 30, carried in the arm assembly, produces in perspective the contour lines 20 traced with the stylus.

The arm assembly is made up of two pairs of arms 21, 22 and 23, 24, of equal length forming two parallelograms, one arm of each pair being connected to a common pivot at either end of a gear spacing link 25 which forms one side of each parallelogram. Gears 26 and 27, also mounted on these pivots, are fastened rigidly to one of each pair of arms, gear 26 being fastened to arm 22, and gear 27 to arm 23. The other ends of each pair of the arms are pivotally connected to links 28 and 29 respectively, which links are lined up on a common axis.

In view of the arrangement of parts, as thus far described, these links 28 and 29 will remain axially aligned regardless of the angle to which the arms are turned relatively to each other. Link 28 has attached thereto the pencil holder assembly 30 at the end of the pencil extension assembly 31. A slide assembly 32 is slidably mounted on the extension bars 33 and 34 for moving the pencil barrel 47 axially with respect to the pencil holder 46 and extension 31. The link 29 has attached thereto the stylus yoke assembly 35.

The picture panel assembly comprises the support arm 36 and the picture panel holder 37. This holder has a protractor scale 38 rigidly fastened thereto, and a protractor pointer 39 fastened to the arm 36 is so arranged as to indicate the angle at which the picture panel holder is tilted from the vertical.

Two sets of picture panel posts 40 and 41 are mounted on this holder for mounting the picture panel sheet on the holder at two different radii of curvature to accommodate the use of the device with or without the pencil extension assembly. When the extension assembly is not used, the pencil holder is mounted directly on the end of the link 28 which is of the same form as the end of the extension assembly. A cord 42 is fastened to the pencil retracting slide assembly, and is passed over pulleys in the link 28 and on the pivot of gear 27 down to a pulley wheel assembly 43 at the bottom of arm 23. This pulley wheel is manually operated by the arm 44 and is held frictionally in any position to which it may be adjusted. The pencil holder is shown in more detail in Figs. 4, 4a and 5. It is held in the arms 33 and 34 of the extension 31 or the link 28, as the case may be, by thumb screws 45, and is composed of the casing 46 and a barrel 47. The barrel 47 is slidably mounted within the casing 46 and is resiliently held against motion away from the picture panel. Inside the barrel is the pencil chuck having axially split wedging portions at the end of a tubular sleeve 48 in which the pencil lead is held tightly by tightening the lock nut 49 against the inner end of the sleeve. This lock nut is removably hooked over to the slide assembly by hooking it over a projection on the slide 32 as shown. A pencil sharpener 50 is provided and is pivotably mounted under one of the thumb screws 45. When the pencil holder extension is not used, the end of the cord 42 nearest the pulley wheel 43 is looped once around this pulley. This shortens the cord sufficiently to enable the use of the slide assembly directly on the shorter arms of the link 28. The pulley assembly 43 is for the purpose of retracting the pencil from the panel sheet during adjustments of the device or when shifting from one contour to another to prevent unnecessary marks on the sketch.

The stylus assembly has a bushing 51 slidably mounted for adjustment on the altitude column 15, and it may be locked in any position by the set screw 52. The yoke assembly 35 is pivotally connected to this bushing at 53. 54 is a set screw for fastening the yoke assembly 35 to the end of link 29.

The upper end of the arm assembly is connected by a swivel 55 to a bracket on the collar assembly 6 so that it may be universally swung about this swivel as the stylus 66 at the bottom of the stylus assembly is moved along the surface of the map 67 on the table 6a.

The operation of the device is as follows: after assembling the device as shown in Fig. 1, the stylus is adjusted so that the point is between .005 and .015'' above the table surface. To insert the lead, loosen the two thumb screws locking the pencil holder assembly to the arm assembly and pivot the assembly to an upright position, removing the grooved nut from the projection on slide 32; carefully insert the lead through the hole in the lock nut at the top of the pencil holder assembly and push it through until a ¼'' of lead projects from the chuck at the bottom of the holder assembly. It may be necessary to loosen the lock nut to insert the lead. Hold the barrel and tighten the lock nut until the lead is secure in the holder. While returning the holder to its normal position parallel with the arm assembly, pull up on the barrel and push down on the pencil retracting slide. When the slide is between the stop nut and pencil holder, release the lock nut and seat the holder in the arm assembly as shown in Fig. 4. Before tightening the thumb screws which hold the pencil holder in position in the arm assembly move the pencil sharpener into sharpening position and sharpen the pencil by rotating the pencil barrel. Then turn the pencil sharpener up and out of the way tightening the two thumb screws 45 and then retract the pencil holder by means of the arm 44 on the pulley wheel assembly 43.

All topographical maps are not produced at the same scale. A contour map of an area of which perspective views are desired may differ widely from the scale engraved on this portable perspective sketcher. It is obvious, of course, that all these various scales cannot be placed on the instrument itself. Some method is necessary therefore by which the sketcher can be adapted to any scale. This is accomplished by means of a factor. A thorough understanding of the importance and use of the factor is necessary to efficient and accurate use of the instrument.

On maps, the most widely used scale is the R. F. or "representative fraction." It is expressed in one of the following forms, all of which means exactly the same thing:

$$\frac{1}{12,000}$$

1:12,000 or 1/12,000. It means that one unit on the map is equal to so many of the same units on the face of the earth; thus 1'' on a map, at the above scale, is equal to 12,000'' on the face of the earth. This indicates also that on the above map 1'' is equal to 1,000'. To use the sketcher with a map on which no scale is indicated, but on which the distance between any two points is known in any unit of length or a map with a bar scale or a map on which some other scale is indicated, it is necessary to first determine the R. F. Example: A map with no scale shown but on which the distance between two hill tops is known to be 4500'. By measuring on the map with a scale it is found to be 4½'' between the two hill tops. The R. F. for the map is:

$$\frac{1}{\frac{4500' \times 12 \text{ (to convert to same units)}}{4\frac{1}{2}''}} = \frac{1}{12,000}$$

The scale on the altitude column is marked at numbered intervals of 100' up to 10,000'. To simplify the marks, the elevations are expressed decimally on the basis of a thousand. An auxiliary fractional scale 68 on the arm assembly collar 6 subdivides the 100' intervals into 20' intervals (see Fig. 17).

The scale on the stylus column is marked in numbered intervals of 100' up to 2500', the last two zeros being omitted. The intervals are subdivided into 20' units. For laying off distances on the table, a measuring stick marked off in 1/8 mile intervals at the same scale (1:5000), may be used.

The first step in the operation of the instrument is to find the factor that will adapt the 1:5000 scale to the map that is to be perspectively sketched. The following examples are given to clarify the meaning of the term "factor."

(1) Assume that a given map is drawn at a scale 1:15,000 and that a sketch is desired from a distance of 6 miles, at a altitude of 9,000'.

a. To determine the conversion factor, divide the map scale by the sketcher scale and the quotient will be the factor. Example:

$$\frac{\text{Map scale}}{\text{Sketcher scale}} = \text{Factor}$$

By substitution $$\frac{15,000}{5,000} = 3$$

b. To use the conversion factor: Example:

$$\frac{\text{Distance (in miles) or altitude (in feet)}}{\text{factor}} = \text{Instrument reading}$$

$$\frac{6 \text{ miles}}{3} = 2 \text{ miles}$$

on measuring stick and $$\frac{9,000'}{3} = 3,000'$$

on the altitude column.

(2) Assuming that the given map is drawn at a scale of 1:21,120 and that the sketch is desired from the same distance of 6 miles and the same altitude of 9,000'.

Solution:

$$\frac{\text{Map scale}}{\text{Sketcher scale}} = \frac{1:21,120}{1:5000} = 4.22 \text{ factor}$$

$$\frac{\text{Distance 6 miles}}{4.22 \text{ factor}} = 1.42 \text{ miles on measuring stick}$$

or approximately 1½ miles.

$$\frac{\text{Altitude 9,000 feet}}{4.22 \text{ factor}} = 2133 \text{ feet on altitude column.}$$

(3) Assuming that the given map is drawn at a scale of 1:4,800 and that the sketch is desired from the same distance of 6 miles and the same altitude of 9,000 feet.

Solution:

$$\frac{1:4,800}{1:5,000} = .96 \text{ factor}$$

$$\frac{6 \text{ miles}}{.96} = 6.25 \text{ miles on measuring stick}$$

$$\frac{9,000 \text{ feet}}{.96} = 9,375 \text{ feet on altitude column}$$

The map Fig. 9 used in the illustrations in this sesction is drawn on a scale of 1:5,000, the same as the instrument scales. The factor is 1 and all distances on the scales correspond to actual distances.

The second step is to select an object that may be used as a principal point. This may be an airfield, bridge, storage tank, an island, etc. In the example illustrated in the drawings, a tank 69 is used as such a principal point.

The third step is to determine the position from which the contour lines are to be respectively sketched. It may be decided that this will be the position from which an observer in an airplane flying at some predetermined altitude would view the contoured area or perhaps the position from which an observer at sea level would view it. In any case three elements are involved: the horizontal distance which is the ground distance between the viewing position that has been decided upon and the principal point; and the bearing which is expressed in degrees of direction from the viewing position to the principal point relative to true north.

To further clarify the sketching operation, a step by step procedure for sketching Fig. 9 from an elevated viewing position is hereinafter outlined:

(1) Determine the principal point which in this case is the tank 69.

(2) Determine the horizontal distance which in this case was decided to be two miles. Since the map scale in Fig. 9 is 1:5,000, the same as the instrument, the factor is 1. Therefore the measuring stick is used to measure two miles thereon from a point directly under the swivel 55 to the principal point on the map. The stylus is then placed over the principal point.

(3) Determine the altitude which in the present instance was selected to be 8,000'. Again the factor 1 is applied and the zero mark on the auxiliary scale on the arm assembly collar is stopped at the 8,000' mark (as shown in Fig. 17), and the collar locked to the tie rod and altitude column. In the start of and for all normal operations, the top of the stylus yoke bushing should be placed against the zero mark on the stylus column and tightened.

(4) Determine the bearing which in the present instance is 021°. The map is rotated under the stylus until this bearing is obtained. A bearing line may be lightly drawn through the principal point, as shown in the drawings.

(5) Adjust the picture panel. As shown in Fig. 3 the picture panel has been raised to a position where it will accommodate the sketch, and the picture panel collar locked to the rod end 13 of the tie rod 11 and to the altitude column 1. A triangle may be used to obtain a 90° angle between the picture panel and the arm assembly when the stylus is on the principal point. This is important for the accuracy of the sketch. The distance between collars will vary according to the conditions, but once fixed, must not be changed until the sketch is completed.

(6) Check the range of the arm assembly. Before starting any drawing, try the extremes of the map to see that the arm assembly reaches all points. In case the stylus will not reach the far extremities, use a stylus extension 69' such as shown in Fig. 16. Several of these extensions of different lengths may be provided with each device, for this purpose. In case the picture panel interferes with the stylus on points close to the altitude column, remove the pencil extension 31, placing the pencil holder and slide assembly on the end portion of the link 28, and the picture panel sheet in the posts 41 nearest the altitude column as shown in Fig. 16, looping the cord 42 one turn around the pencil retracting pulley 43. This adjusts for the shorter extension.

(7) Check the range of the pencil. See that the pencil will make contact with the picture panel sheet when the stylus is touching all the extremes of the map. Retract the pencil and insert drawing paper under the clip 70 on the picture panel.

(8) Trace the lowest line first. In Fig. 6 the stylus has been moved to a point on the sea level contour line, the pencil released so that it would make contact with the drawing paper and the sea-level line on the map carefully traced with the stylus. The produced line 20 is shown in perspective on the drawing paper.

(9) Lower the collars 6 and 7. It will be evident that if the second contour line represents an elevation of 250' above the first, actually the map should be elevated proportionally if the proper perspective for the second line is to be obtained. It is not feasible to elevate the map, but the same effect is obtained by lowering the collars as a unit. This is accomplished by loosening both collar thumbscrews 8 and 9 and rotating the pinion knob 14. To avoid smudges or gaps which would mar the completed drawing, the operator must always remember to retract the pencil by operating the lever 44 on the pencil retracting pulley 43 on completing the tracing of a contour line, or before lowering the collars, and to release it before starting to trace a line.

(10) Trace the lines consecutively. Since the interval between lines represents an elevation of 250' and the factor is one the pencil must be retracted, the collars lowered as a unit through 250', the pencil released and the necessary elevation line produced. This procedure must be followed until all the lines have been produced on the picture panel.

Figure 10:
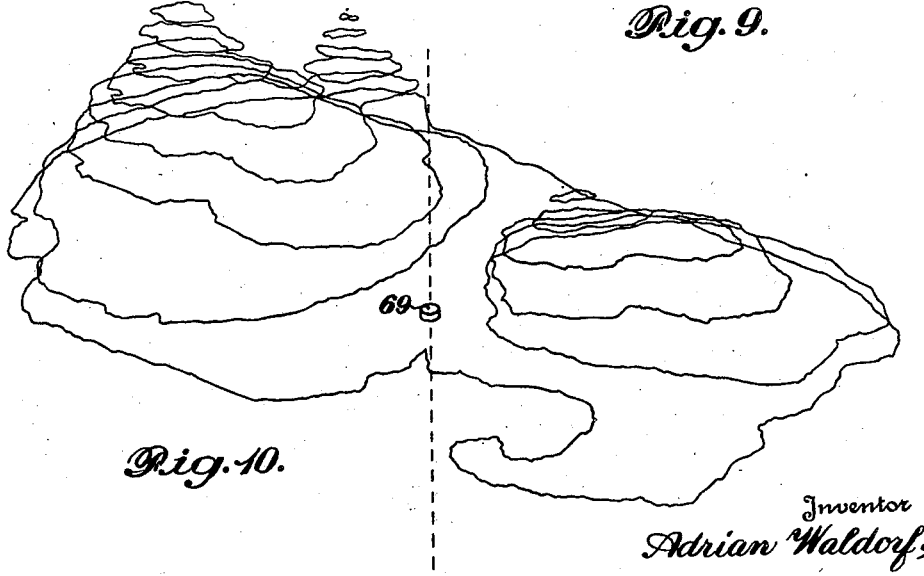

The sketch of the contoured area as it has been produced by the instrument is shown in Fig. 10. The contour lines, it will be seen, show up in their entirety. The portions of the lines representing the back or hidden parts of the elevations should be eliminated. As the operator gains experience, he will learn to estimate the portions of each line to be sketched. A step by step method for eliminating hidden lines is outlined below, and illustrated in Figs. 11 to 13. The contour lines are connected as in Fig. 11 and the visible portions of each line separated from the hidden portions. The visible lines in Fig. 11 are strengthened by retracing them by hand and bringing them up to the same strength as the connecting lines.

Light and shadow can greatly change the appearance of an area, and the usefulness of a sketch will be greatly increased if the time of day it is to depict is anticipated. A step by step method for completing a drawing with a definite time of day in mind is outlined below, using Fig. 12 as an illustration.

Figure 12:
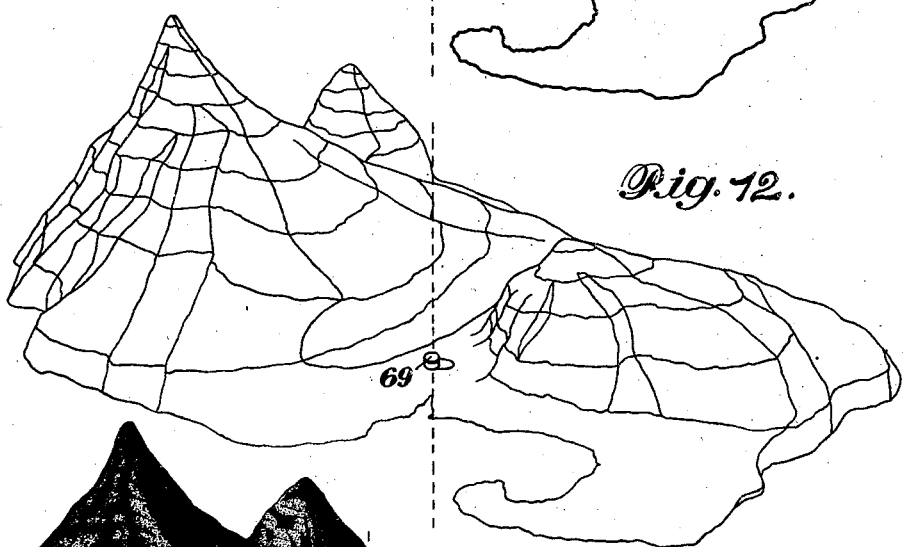

The approximate hour of the day the sketch is to be used is first ascertained. Fig. 12 has been completed to show the contoured area as it would appear in the late afternoon. The direction of the sunlight is determined by considering the bearing selected for sketching the contoured area. This was slightly east of north, therefore for a late afternoon view the light was represented as coming from the left at a low angle. Next the extent of the surfaces which the light will strike were definitely determined before shading was begun.

Figure 11:
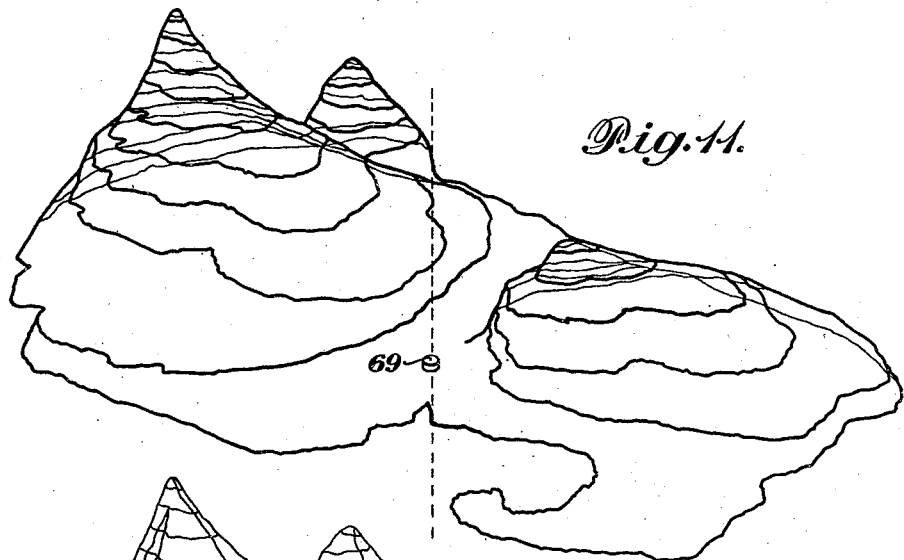
Figure 13:
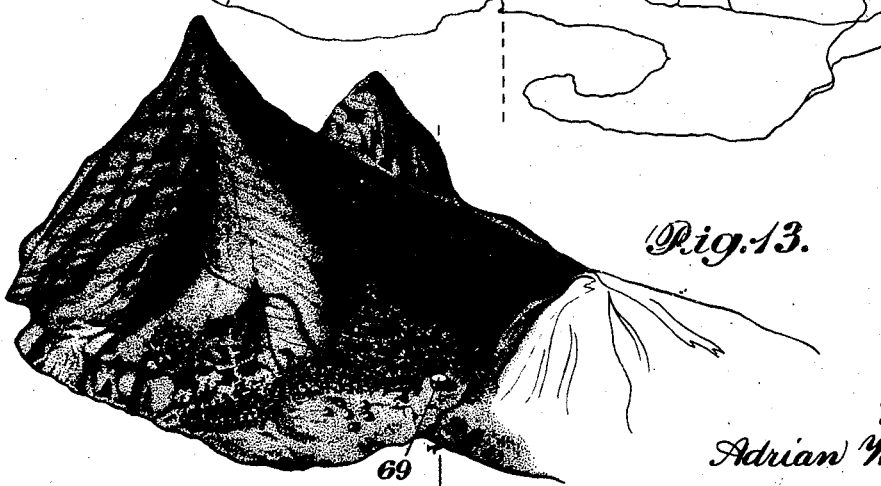

By the use of an overlay, a tracing may be obtained from Figs. 11 and 12 and completed with pencil shading to represent more or less of a complete shaded drawing, depending on the amount of information supplied by the contour lines. Oftentimes, additional information is available which can be incorporated in a drawing. In such cases, a more advanced technique may be desirable. As the operator gains experience and proficiency there will come to mind many variations and improvements. Fig. 13 is given as an illustration of a more developed sketch with additional information which was available.

So far the operation of the device was described with reference to a viewpoint at some distance above sea-level. When producing a contoured area for a sea-level perspective, the horizontal distance and bearing are determined as above. The altitude however is the height of the elevations represented by the contour lines above the viewing position, and the stylus column is now used to interpret altitude instead of the altitude column. For a sea-level perspective, the lines are produced as though the observer were looking up at them. Fig. 14 illustrates the step by step method for producing contour lines from a sea-level viewing position as follows:

(1) Lower the collars 6 and 7 as shown in this figure. The thumbscrews 8 and 9 lock the arm assembly collar 6 and picture panel collar 7 to the tie rod 11 at the bottom of the altitude column. This sets the zero on the auxiliary scale to the zero on the altitude column.

(2) The arm assembly is set at zero altitude on the stylus column 15. Both ends of the arm assembly were at the same height above the plane of the map when the tracing operations were begun.

(3) Set the picture panel perpendicular to the pencil holder assembly. This may be checked by the pointer 39 on the protractor scale 38 in the rear of the picture panel sheet. The scale should read 0°.

(4) Check the range of the arm assembly and pencil as previously described.

(5) Trace the sea-level line first. The sea-level is produced as a straight line, as is plainly evident in Fig. 14.

(6) Trace the contour lines consecutively. Since the map is on the same scale as the instrument, the factor is 1. For each succeeding contour line the pencil is retracted, the stylus yoke bushing raised 250' on the stylus column scale, the pencil released and the line traced. Fig. 14 shows the position of the instrument when the 1,000' contour line was being traced. The top of the stylus yoke bushing is shown at the 1,000' mark on the stylus column scale.

(7) Complete the drawing. The sketch is removed from the panel, the contour lines are connected and the perspective sketch is completed on a tissue overlay as in the previous operation.

The pivotal joints of the instrument are provided with elastic stop nuts for restraining the assembly studs and providing the necessary friction so that the tracing may be readily made without the joints binding, but so as to prevent too free a movement of the arms. When the elastic stop nuts are properly adjusted, the instrument will work accurately, and a figure traced first in a clockwise direction and then in a counterclockwise direction, will follow the same line.

Many variations in the arrangement of parts and dimensions may be made without departing from the spirit and scope of this invention, as defined in the appended claims.

The invention described herein may be manufactured and used by or for the Government of the United States of America for governmental purposes without the payment of any royalties thereon or therefor.

What is claimed is:

1. A portable perspective sketcher comprising an altitude column for mounting on a table, slidably adjustable collar means thereon, a scale adjustable on said column for indicating the altitude to which said collar means is adjusted, a drawing panel sheet mounted on an adjustable bracket extending from a second slidably adjustable collar means on said column, and an extensible arm assembly universally swiveled to said first collar means and having an arm for guiding a pencil on the surface of said panel sheet and means on said extensible arm assembly for mounting a tracing stylus movable over said table so as to maintain alignment of said stylus mounting means and said pencil with reference to said swivel, the level of said stylus mounting being adjustable to the altitude represented by the line being traced by the stylus for reproduction on said panel sheet.

2. A perspective sketcher including a pencil holding arm mounted on a universal swivel and an extensible lever assembly attached to said arm for guiding a stylus mounted at its extremity along a substantially rectilinear axis on the same side of said swivel with respect to said arm regardless of its displacement from said arm.

3. A perspective sketcher including an altitude column for mounting on a table, a bracket slidably adjustable on said column, a universal swivel on said bracket, an arm on said swivel, an extensible lever assembly attached to said arm on the same side of said swivel for guiding its extremity along a substantially rectilinear axis with respect to said arm regardless of its displacement from said arm, a pencil on the end of said arm, and an adjustable panel sheet for mounting drawing paper to receive tracings made by said pencil.

4. A perspective sketcher including an altitude column for mounting on a table, a bracket slidably adjustable on said column, a universal swivel on said bracket, an arm on said swivel, an extensible lever assembly attached to said arm on the same side of said swivel for guiding its extremity along a substantially rectilinear axis with respect to said arm regardless of its displacement from said arm, a pencil on the end of said arm, a stylus, a leg structure supporting said stylus closely over a table surface, and a yoke attached to the extremity of the extensible arm assembly and pivoted to said leg structure.

5. A perspective sketcher including an altitude column for mounting on a table, a bracket slidably adjustable on said column, a universal swivel on said bracket, an arm on said swivel, an extensible lever assembly attached to said arm on the same side of said swivel for guiding its extremity along a substantially rectilinear axis with respect to said arm regardless of its displacement from said arm, a pencil on the end of said arm, a stylus, a leg structure supporting said stylus closely over a table surface, an altitude shaft on said leg structure, a slidably adjustable bushing on said shaft, and a yoke attached to the extremity of the extensible arm assembly and pivoted to said bushing.

6. A perspective sketcher including an altitude column for mounting on a table, a bracket slidably adjustable on said column, a universal swivel on said bracket, a link on said swivel pivoted at its ends to a pair of equal parallel bars, a second link of the same length as said first one pivoted at its ends to a pair of similar parallel bars, a third link of the same length as the others pivoted to the other ends of both pairs of parallel bars, equal gear sectors mounted for turning on said common pivots and meshed with each other, one of said gears being rigid with one of said one pair of parallel bars, the other gear being rigid with the opposite one of said other pair of parallel bars whereby the first and second links are maintained in alignment while the distance between them may be varied within the limits of the operation of the parallelogram structure formed by the above combination, a stylus attached to said second link for tracing lines of elevation on a contour map on said table, means for adjusting the level of said stylus with respect to its attachment and a pencil holder attached to said first link for guiding a pencil and making reproductions of said lines.

ADRIAN WALDORF.

REFERENCES CITED

The following references are of record in the file of this patent:

UNITED STATES PATENTS

| Number | Name | Date |
|---|---|---|
| 888,249 | Meyer | May 19, 1908 |
| 2,171,894 | Rule | Sept. 5, 1939 |

FOREIGN PATENTS

| Number | Country | Date |
|---|---|---|
| 361,318 | French | June 15, 1906 |
| 176,067 | Swiss | Mar. 31, 1935 |